US005364424A

United States Patent [19]

Teles De Menezes Jûnior

[11] Patent Number: 5,364,424
[45] Date of Patent: Nov. 15, 1994

[54] FILTER FOR WASHING AND RETENTION OF EXHAUST GASES IN MOTORIZED VEHICLES

[76] Inventor: António Teles De Menezes Jûnior, Rua da Constituição, n°. 1.479 - 3°. Esq°., 4200 Porto, Portugal

[21] Appl. No.: 59,755

[22] Filed: May 12, 1993

[30] Foreign Application Priority Data

May 15, 1992 [PT] Portugal .................................. 100490

[51] Int. Cl.$^5$ .............................................. B01D 47/00
[52] U.S. Cl. ........................................ 55/228; 55/229; 55/248; 55/255; 55/257.6; 55/269; 55/472; 55/DIG. 30
[58] Field of Search ................ 55/228, 229, 248, 255, 55/256, 257.4, DIG. 30, 257.6, 338, 276, 468, 472, 227, 269

[56] References Cited

U.S. PATENT DOCUMENTS

| | | | |
|---|---|---|---|
| 1,032,536 | 7/1912 | Gerli et al. | 55/256 |
| 2,612,745 | 10/1952 | Vecchio | 55/256 |
| 3,282,047 | 11/1966 | Wertheimer | 55/229 |
| 3,487,607 | 1/1970 | Cox | 55/228 |
| 3,566,583 | 3/1971 | Ashmore | 55/255 |
| 3,621,652 | 11/1971 | Demaree | 55/228 |
| 3,630,030 | 12/1971 | Wagner | 55/228 |
| 3,803,813 | 4/1974 | Yuzawa | 55/255 |
| 3,984,219 | 10/1976 | Huang | 55/255 |
| 4,949,539 | 8/1990 | Hsu et al. | 55/228 |

FOREIGN PATENT DOCUMENTS

| | | | |
|---|---|---|---|
| 220874 | 4/1959 | Australia | 55/255 |
| 2913580 | 10/1980 | Germany | 55/256 |

*Primary Examiner*—Charles S. Bushey
*Attorney, Agent, or Firm*—Wenderoth, Lind & Ponack

[57] ABSTRACT

A filter for washing and retaining exhaust gases in motor vehicles includes one or more chambers formed by either a single chamber with a plurality of sections formed by partitions therein or by separate chambers. Each chamber is provided with an exhaust gas inlet pipe for exhaust gases that have already been partially filtered in a previous chamber or section, or, in the case of a first chamber or section, exhaust gases coming directly from the engine of the motor vehicle. The gases are injected into a filtering liquid by diffusing pipes in the chambers. The exhaust gases are filtered by the filtering liquid as they flow through the liquid, passing afterwards to a subsequent chamber or section, or to the atmosphere through an exhaust outlet. In order to prevent the gases from tending to carry the filtering liquid out of the chambers when passing through the chambers, the chambers are provided with a series of perforated plates that hinder the passage of bubbles of the filtering liquid that may be formed therein. Further, the last chamber or section has at its outlet a decompression chamber having a return conduit for returning liquid to the chambers. The filter is also provided with filling and drainage orifices for cleaning and maintaining the filter.

7 Claims, 3 Drawing Sheets

FILTER FOR WASHING AND RETENTION OF EXHAUST GASES IN MOTORIZED VEHICLES

BACKGROUND OF THE INVENTION

1. Field of the Invention

In this day and age, drastic action is required to avoid increasing assaults by pollution on the earth. It has become an absolute necessity to fight toxic gas emissions into the atmosphere. Accordingly, the present inventor, having long been aware of the pollution problem, especially pollution into the atmosphere has conceived and developed a filtering arrangement for eliminating toxic and pollutant gas emissions originating from vehicle exhausts based on washing and retaining motorized vehicle exhaust gases.

2. State of the Art

Vehicles with combustion engines today primarily employ catalytic systems for treating exhaust gas. However, catalytic systems and catalysts, besides being expensive, require lead free fuel, are short-lived and are very sensitive in a cold-start, thus necessitating pre-heating systems to avoid harmful effects over the internal walls thereof.

SUMMARY OF THE INVENTION

The present invention provides one filter applicable to combustion engines, whether or not they employ leaded fuel or are diesel engines and the like, and is based on one filtering liquid action. The filtering liquid is easily replaceable once it becomes saturated and is chosen in accordance with the type of engine and the type of fuel used in the engine.

The filter comprises a single liquid tank having one or a number of washing sections. Exhaust gases pass through the washing sections before being allowed to reach the atmosphere. If the exhaust gases require several washes, the gases will pass successively from one section to another in the liquid tank so as to be progressively cleaned and to reach a desired purity before being transmitted to the atmosphere.

Each section of the liquid tank has an exhaust gas inlet and exhaust gas outlet for inputting and transferring exhaust gases from that section. A distributer transports the gases from the inlet or opening at the entrance of the tank section to a point below the level of the filtering liquid in the tank section. A group of perforated plates is provided in each tank section. The function of the plates is to prevent the exhaust gases from tending to push the filtering liquid out of the outlet of the tank section so that only exhaust gas is vented from each tank section. A purging hole and a filling hole can be provided in the filter for purging and refilling the filtering liquid in the tank sections. Appropriate closures or plugs are provided for the purging and filling holes. Each tank section in the filter is communicated with the remainder of the tank sections at a lower portion thereof so that the filtering liquid remains at the same level in each of the tank sections.

In addition to the above elements, it is possible to include a decompression chamber at the outlet of the liquid tank. Such a decompression chamber allows for steam condensation of the filtering liquid that may be contained in the purified exhaust gases being vented to the exhaust gas outlet of the liquid tank. An automatic system for purging water resulting from condensation can also be provided, especially in the case of the use of oil as the filtering liquid. A refrigerating system can also be included for refrigerating the filtering liquid. Such a refrigerating system could be composed by a group of a pump, a radiator, and a fan. Auxiliary washing systems can also be provided with the liquid tank of the filter arrangement, composed of gas aspirating fans for aspirating the exhaust gases, the exhaust gases being cooled by jets of the filtering liquid associated with the fans. The filtering liquid may be introduced by injectors, with the filtering liquid being supplied from the refrigeration circuit. The jets of the filtering liquid, besides the function of cooling, will help to better wash the aspirated gases in conjunction with the fans, will help to avoid any residual detritus from sticking to the blades of the fans, and will also disperse any eventual remaining material from the extracted gases coming to the surface of the filtering liquid.

In the particular case of diesel vehicles, a pan-in-water purging system may be considered. A small tank is mounted at the end of the filter in order to allow condensation inside that tank, and thus not in the exhaust. The liquid inside the small tank should be water.

In addition to the advantages of the filter arrangement according to the present invention in being used in internal combustion engines, whether or not they employ lead free fuel, and further, in diesel engines and other types of engines, the present invention has the further advantage of allowing for total dispensing with the traditional exhaust muffler because of the absorbing effects of the filtering liquid on the exhaust gases.

In accordance with a further feature according to the present invention, a traditional muffler could be maintained on a vehicle, together with the filter arrangement according to the present invention, that will not have exhaust gases pass therethrough unless the filter arrangement is damaged. In that case, a valve located in the entrance of the filter arrangement is employed to bypass the exhaust gases from the filter arrangement, placing the filter arrangement out of service, to the traditional muffler.

DETAILED DESCRIPTION OF THE PREFERRED EMBODIMENTS

Figure 1:
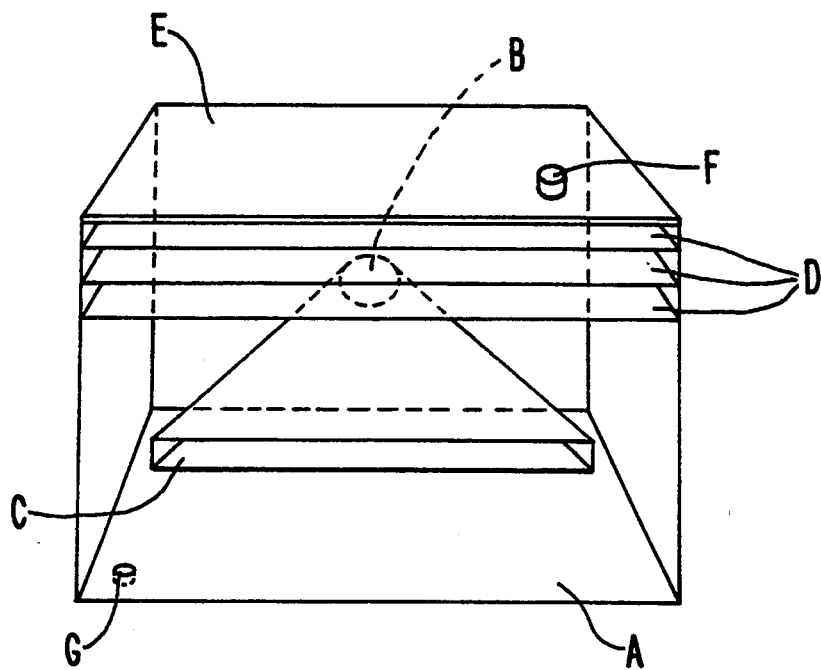
FIG. 1 is a perspective schematic diagram of a first embodiment of a filter arrangement according to the present invention.

The following description is made with reference to the attached drawings, in which similar reference numerals refer to similar elements throughout the various drawing figures.

FIGS. 1 to 5 illustrate a first embodiment according to the present invention. FIG. 1 illustrates a liquid tank A of the filter arrangement, the liquid tank comprising essentially a filter body defining a chamber therein. One side of the liquid tank has a gas entrance B connected with a gas distributer C. Perforated plates D are provided in the upper portion of the chamber of the liquid tank. A lid E of the tank is provided with a filtering liquid fill hole F. Also, a tank purging hole G is provided in the lower wall of the liquid tank A.

Figure 2:
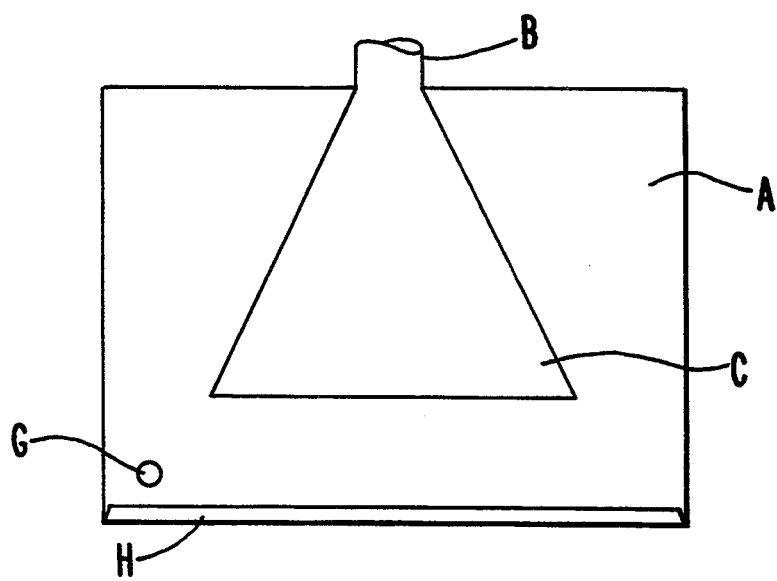
FIG. 2 is a top and partially sectional view of the filter arrangement of FIG. 1.

In FIG. 2, the plates D have been removed in order to more easily view the features illustrated therein. In this figure, the filter arrangement is seen in a horizontal plane, and the diffuser C connected with the exhaust gas inlet B can be clearly seen as extending into the liquid tank A, with the purging hole G placed in one corner thereof. Further, an exhaust gas outlet H is defined for the exhaust gases after the exhaust gases have been cleaned in the liquid tank A.

Figure 3:
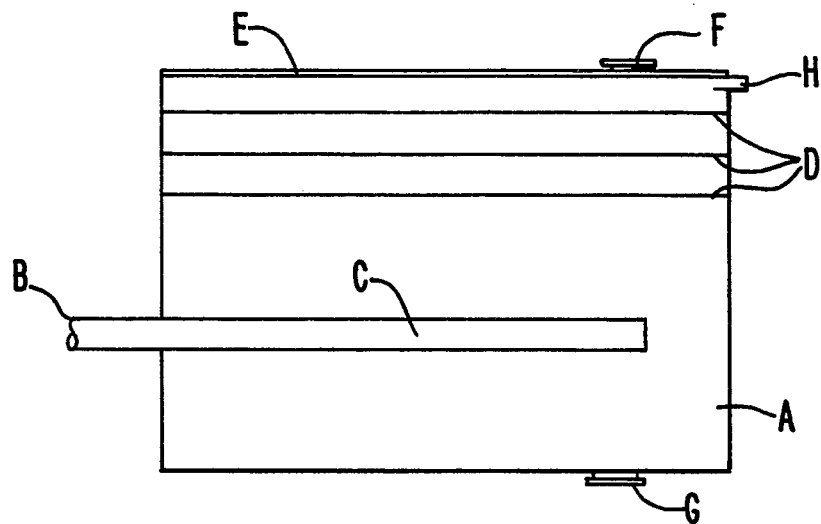
FIG. 3 is a sectional side view of the filter arrangement of FIG. 1.

FIG. 3 shows the liquid tank A from the side in a partially cut away view. From this view, taken along the vertical plane, the exhaust gas entrance B can be seen as connected with the distributor C, as above, with the perforated plates D located thereabove. Similarly, the appropriate locations of the lid E, the hole F in the lid E, the purging hole G and the exhaust gas outlet H for the clean exhaust gases can be easily seen.

Figure 4:
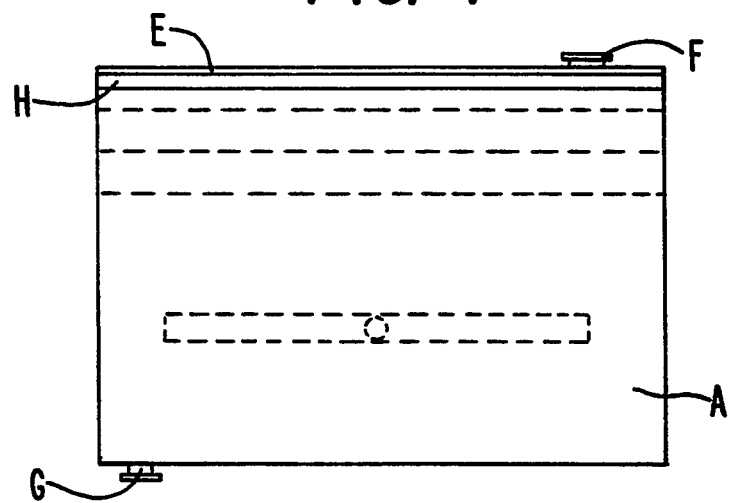
FIG. 4 is a front view of the filter arrangement of FIG. 1.
Figure 5:
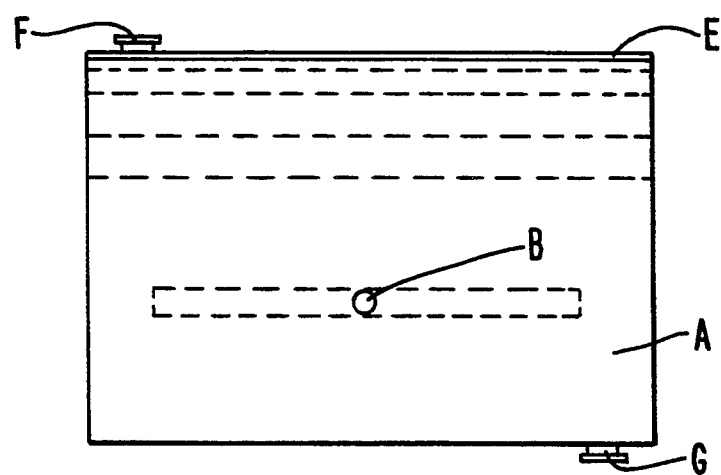
FIG. 5 is a rear view of the filter arrangement of FIG. 1.

FIGS. 4 and 5 show the filter arrangement from the front and rear, respectively. From the front view of FIG. 4, the exhaust gas outlet or cutting H for the cleaned gases can be seen. In FIG. 5, the location of the exhaust gas inlet B can be clearly seen. Otherwise, these two Figures simply illustrate the remaining features as discussed above, including the overall liquid tank A, the lid E and the holes F and G.

In operation, a filtering liquid is placed into the liquid tank A through the hole F. An amount of filtering liquid is provided such that the distributor C is below the level of the filtering liquid and at least one of the plates B is above the level of the liquid. The gases from the engine of the motor vehicle enter into the filter arrangement, i.e. the liquid tank through the exhaust gas inlet B, passing on to the distributor C. As can be seen from the Figures, the distributor C starts out narrow and becomes wide at its end. The exhaust gases from the engine are then allowed to decompress into the filtering liquid inside the filtering tank A. The filtering liquid then retains toxic elements of the exhaust gases and decreases the temperature thereof.

As noted, the perforated plates D are located over the distributor C, and also above the filtering liquid surface level. Their function is to prevent bubbles of the filtering liquid from escaping through the exhaust gas outlet or cutting H together with the cleaned exhaust gases. The exhaust gas outlet H is located at the front of the liquid tank A, close to the lid E. Thus, the exhaust gas outlet is located such that the exhaust gases, having been supplied to the filtering liquid in the liquid tank A by the distributor C, rise through the filtering liquid, through the perforated plates B and to the exhaust gas outlet H. The filtering arrangement of the present invention is almost without maintenance, requiring simple level control of the filtering liquid in the liquid tank A. The hole F is employed for filling the filtering liquid into the liquid tank A, and the hole G at the bottom of the tank is employed for purging the filtering liquid from the tank in order to clean the inside of the liquid tank A. Suitable closures are provided for maintaining the holes F and G closed during operation of the filter arrangement.

The filtering liquid, which also serves to cool the exhaust gases, can be, for example, a mineral oil, an animal oil or a vegetable oil. Gases that filter through the filtering liquid and are cleaned thereby can then be released to the atmosphere without polluting agents or other harmful effects to the environment.

Figure 6:
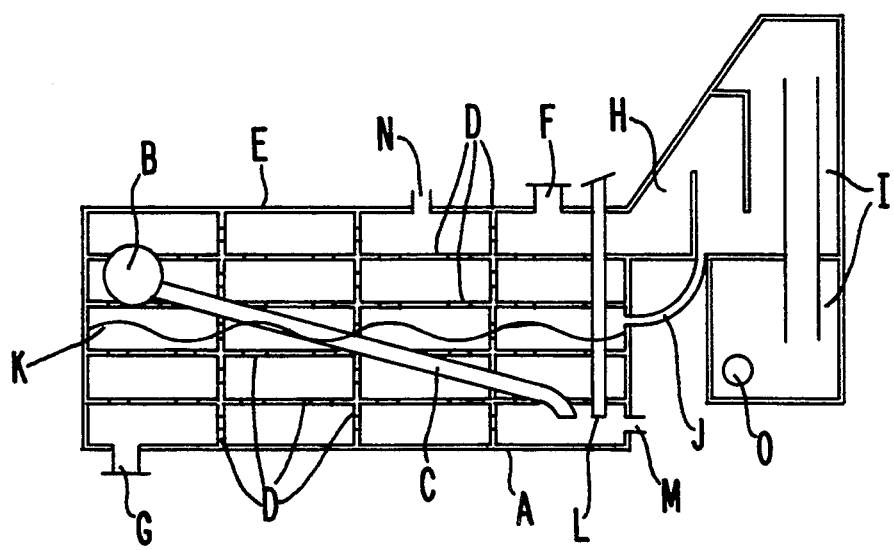
FIG. 6 is a schematic diagram of a second embodiment of the filter arrangement according to the present invention.

FIG. 6 shows the second embodiment according to the present invention. This embodiment has been tested on an internal combustion engine working on the Otto cycle using leaded gasoline and normal water as the filtering liquid.

The filter arrangement of this embodiment is shown in FIG. 6 in a transverse sectional view. Similar to the first embodiment, the second embodiment comprises a liquid tank A having an exhaust gas inlet B for the exhaust gases. Four distributors C are connected with the exhaust gas inlet B and are composed of a plurality of tubes extending from a single tube for distribution of the exhaust gases into the bottom of the liquid tank A. Perforated plates D are provided in the liquid tank A in both horizontal and vertical directions. A similar upper part or lid E is provided on the liquid tank A, having a similar hole F for filling of the filtering liquid therein. A similar purging hole G is provided at the bottom of the liquid tank A, and a gate or exhaust gas outlet H for exhausting the gases from the liquid tank body is provided at the upper right hand portion of FIG. 6. The exhaust gas outlet H connects with a decompression chamber I. A connecting tube J connects the liquid tank body A with the chamber I for returning water condensed in the chamber I to the chamber of the liquid tank A. The filtering liquid is designated by K, and the level thereof can be seen in FIG. 6. A temperature sensor tip L is immersed in the filtering liquid for detecting the temperature of the filtering liquid. The temperature sensor tip L is employed together with the refrigeration circuit connected between a hole N and a hole M. Thus, the temperature sensor tip L detects the temperature above which an external water cooling system should be employed to cool the tank water by circulation of the water through the hole M to the external water cooling system, returning the water to the tank through the hole N. A further hole O exhausts the cleaned exhaust gases from the filter arrangement to the atmosphere.

Figure 7:
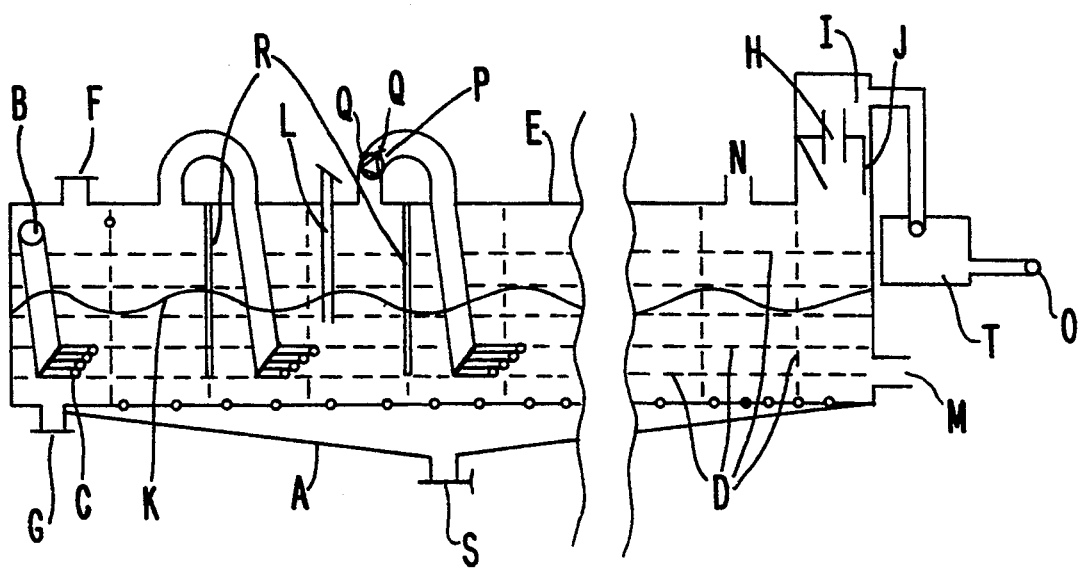
FIG. 7 is a schematic diagram of a third embodiment of a filter arrangement according to the present invention.

FIG. 7 illustrates a third embodiment of the filter arrangement of the present invention. This embodiment was tested on a diesel engine with the employment of oil as the filtering liquid.

FIG. 7, similar to FIG. 6, shows a transverse sectional view of the filter arrangement. The liquid tank A of FIG. 7 is arranged for multiple passes of the exhausted gases through a number of filtering liquid washing section. Components B to O are the same as those discussed with reference to FIG. 6, and thus a further discussion thereof will not be presented. A turbine or fan P for partially filtered gas aspiration is located at an upper part of the liquid tank A. In particular, the fan P can be seen in FIG. 7 located in a passage between two sections of the liquid tank A. The turbine or fan P is used together with corresponding filtering liquid injectors Q. The injectors Q inject jets of the filtering liquid with the exhaust gas stream supplied by the fan P to further cool and clean the exhaust gases. The advantages of this arrangement have been discussed in the Summary of the Invention. As can be seen, a number of dividing plates R are disposed inside the tank separating the liquid tank A into the different filtering phases.

Thus, the exhaust gas is first supplied to the exhaust inlet B through the distributor C into a first of the tank sections. From here it is supplied through subsequent sections through appropriate structure communicating the top of the tanks section with a portion of a subsequent tank section below the level of the filtering liquid K. Thus, once cleaned exhaust gases are further cleaned in a subsequent tank section. It is further noted that the tank sections communicate with each other at a level below the level of the filtering liquid K. Also, provided inside the liquid tank A is an automatic water purging system S. Noting that the filtering liquid in the tank A of FIG. 7 may be oil, as in the present example, water may condense in the liquid tank A during the gas filtering procedure. Due to its greater density, the water will be located at the bottom of the tank, and thus an automatic water purging system S can be provided for automatically purging the water from the liquid tank A. A supplementary tank T can also be provided between the decompression chamber I and the outlet O to the atmosphere for further condensation of water therein outside of the liquid tank A.

I claim:

1. A filter arrangement adapted to wash and retain exhaust gases of a motor vehicle, said filter arrangement comprising:
    a filter body defining a chamber containing a filtering liquid therein;
    an exhaust gas diffuser extending into said chamber and having a diffuser outlet immersed in said filtering liquid;
    a plurality of perforated plates in said chamber, at least one of said perforated plates being located above the level of said filtering liquid;
    a cooling circuit located externally of but being fluidly connected to said chamber for cooling said filtering liquid;
    at least one fan fluidly communicating with said chamber and being located above the level of said filtering liquid, said at least one fan having at least one filtering liquid injector associated therewith for cooling and filtering of exhaust gases moved by said fan with jets of filtering liquid from said filtering liquid injector; and
    an exhaust gas outlet in said chamber located such that said perforated plates are between said exhaust gas outlet and said diffuser outlet.

2. The filter arrangement of claim 1, wherein said exhaust gas diffuser has an inlet portion for input of exhaust gases, said inlet having a valve connected therewith, said valve having a muffler connected thereto, and said valve being selectively actuable to input exhaust gases to only one of said exhaust gas diffuser and said muffler.

3. The filter arrangement of claim 2, wherein the filtering liquid is oil and an automatic water purger is provided at the bottom of said chamber.

4. The filter arrangement of claim 1, wherein the filtering liquid is oil and an automatic water purger is provided at the bottom of said chamber.

5. The filter arrangement of claim 1, wherein:
    said filtering body has at least one partition therein dividing said chamber into a plurality of subchambers;
    each said subchamber fluidly communicates with the remaining said subchambers below the level of the filtering liquid;
    said exhaust gas diffuser extends into a first of said subchambers, and the first of said subchambers has a portion thereof above the level of the filtering liquid fluidly communicating with a portion of a subsequent one of said subchambers below the level of the filtering liquid; and
    said plurality of perforated plates extend in each of said subchambers.

6. The filter arrangement of claim 1, wherein said exhaust gas outlet is connected with a decompression chamber, and said decompression chamber has a condensed liquid return pipe communicating said decompression chamber with said chamber containing the filtering liquid.

7. A filter arrangement adapted to wash and retain exhaust gases of a motor vehicle, said filter arrangement comprising:
    a filter body defining a chamber containing a filtering liquid therein;
    an exhaust gas diffuser extending into said chamber and having a diffuser outlet immersed in said filtering liquid;
    a plurality of perforated plates in said chamber, at least one of said perforated plates being located above the level of said filtering liquid;
    at least one fan fluidly communicating with said chamber and being located above the level of said filtering liquid, said at least one fan having at least one filtering liquid injector associated therewith for cooling and filtering of exhaust gases moved by said fan with jets of filtering liquid from said filtering liquid injector; and
    an exhaust gas outlet in said chamber located such that said perforated plates are between said exhaust gas outlet and said diffuser outlet.

* * * * *